March 9, 1948.  H. A. HICKS  2,437,664
VEHICLE WINDSHIELD CONSTRUCTION
Filed March 27, 1944   2 Sheets-Sheet 2
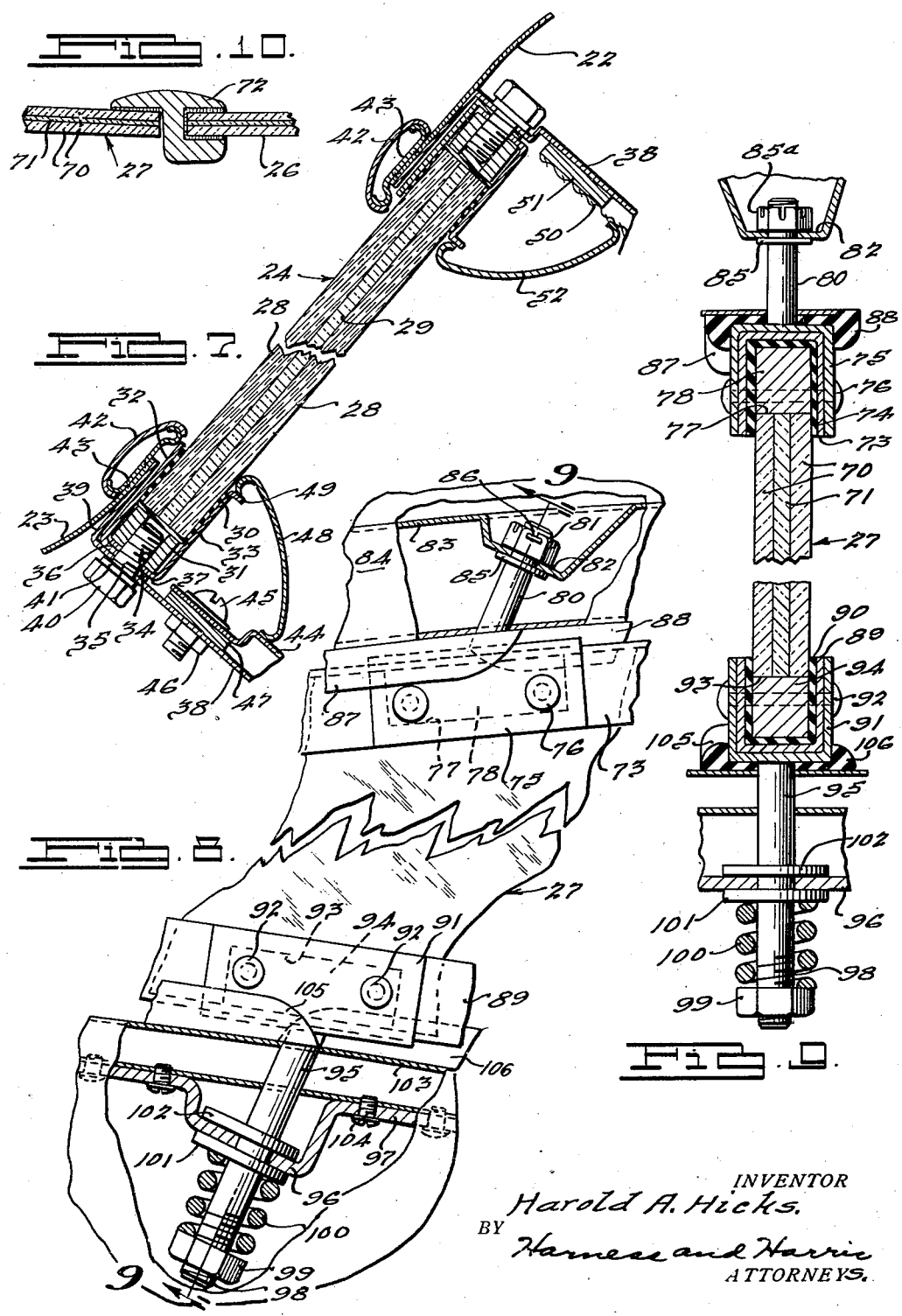
INVENTOR
Harold A. Hicks.
BY Harness and Harris
ATTORNEYS.

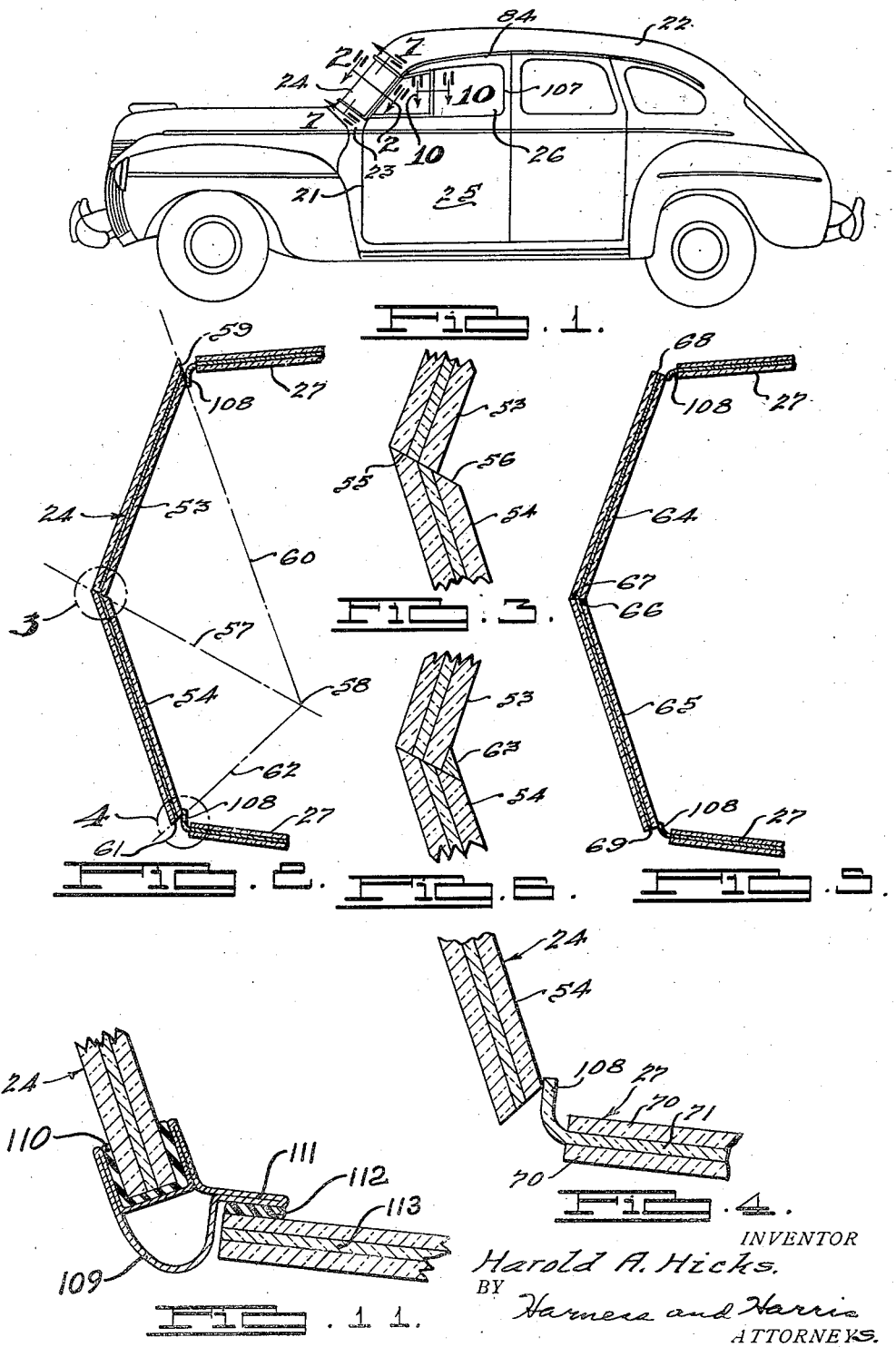

Patented Mar. 9, 1948

2,437,664

UNITED STATES PATENT OFFICE 2,437,664

VEHICLE WINDSHIELD CONSTRUCTION

Harold A. Hicks, Detroit, Mich., assignor to Chrysler Corporation, Highland Park, Mich., a corporation of Delaware Application March 27, 1944, Serial No. 528,219

6 Claims. (Cl. 296—84)

This invention relates to an automobile body construction, and it has particular reference to a body structure wherein the field of vision through the windshield and adjacent side windows is unobscured by any solid opaque columns, thereby providing a panoramic view through the front of the car, and adding to the safety and comfort of driving.

In the operation of automobiles having closed bodies, it has been repeatedly noticed that the columns at the front of the car, between the driver's seat and the windshield, interfere with vision to the right or left, and form blind spots, which constitute a safety hazard, and which also add to the physical and psychological strains of driving. Efforts to reduce the size of such columns, or "A" posts, as they are commonly called, are necessarily limited by the circumstance that such columns have the functional duty of supporting the roof of the car body. The inclusion of the A posts is therefore characteristic of cars of American design, overhanging or cantilever supported roofs which might permit of the elimination of the posts are much more expensive, and are open to other objections from the viewpoint of domestic practice.

One factor which has precluded consideration of A post elimination is that the post ends are points of high, if not maximum, stress and distortion during normal operation of the vehicle. That is to say, the forces to which the car body are subject appear to concentrate at each side of the car at the junction of the side panels and the cowl, and also over the body at the forward end of the roof. Accordingly, the A post ends receive maximum strains which must be met by making the columns of sufficient size and strength, to meet the forces which are encountered. From such considerations, it will be apparent that an overhanging type of roof must be heavily braced if it is to endure at all, and the costs of such bracing, together with interferences with other features of body design, have therefore relegated such expedients or considerations to the field of pictorial imagination.

I have discovered, however, that the A posts may be eliminated in an entirely practical way, provided suitable means are adopted to replace the load sustaining function of such columns with another member, and in such fashion that the new member does not interfere with clear vision. For this purpose, I utilize the windshield glass itself. Safety glass, or similar transparent materials suitable for windshields, has enough inherent strength to serve as a structural member in the body construction, provided it is so mounted or installed as to transmit properly the loads applied to it.

A word of explanation may be indicated in connection with these statements, since it is recognized that many experienced body designers may be initially in disagreement. It has heretofore been accepted by some that the shield, mounted transversely of the body in front of the driver's seat, should be so installed as to have appreciable freedom of movement. Rather than securing such glass with considerable rigidity, after the manner of holding the panes of building sash by the stiles and mullions, the common practice has been to set automobile glass in strips of soft or sponge rubber, or by some like expedient provide a cushion on which the windshield may move, and thereby be free from loads. I find, however, that this practice is not necessary, and that, if the lower edge of the windshield is substantially integrated to the cowl and adjacent parts of the car body, it can be made to carry the load, thereby performing its former functions, and also those heretofore ascribed to the A posts.

An object of the present invention is to provide an improved windshield construction for an automobile that involves the elimination of the usual posts at the sides of the windshield.

Another object is to provide a windshield construction through which loads may be transmitted.

A further object is the provision of an improved windshield that improves the visibility of a car in which it is mounted.

Still another object is the provision of an improved side-wing construction for an automobile, through which load may be transmitted.

A still further object is the provision of an improved side-wing construction that along with the windshield of an automobile makes possible the elimination of posts and other vision-blocking instrumentalities at the ends of the windshield.

Another object is to provide improvements in a seal between the front door of an automobile and the windshield. In a more particular sense, the seal is employed between a windshield and a side wing of an automobile at a region from which a post or other vision-obscuring means have been eliminated.

Other objects will appear from the disclosure.

In the drawings:

Fig. 1 is a perspective of a passenger automobile typifying American practice, to which the invention has been applied;

Fig. 2 is a section through the windshield, taken substantially along the line 2—2 of Fig. 1;

Figs. 3 and 4 are enlarged views of the areas designated by the same numerals in Fig. 2;

Figs. 5 and 6 are similar views showing modifications of the joint between sections of the windshield;

Fig. 7 is another section through the windshield, showing how the same is mounted on the cowl portion of the body to constitute a load carrying member, the view being taken on the line 7—7 of Fig. 1;

Fig. 8 is a view, partially in section, showing how the wing may be mounted for turning movement;

Fig. 9 is a sectional view taken on the line 9—9 of Fig. 8;

Fig. 10 is a detail taken on the line 10—10 of Fig. 1 to show how the side wing abuts the side window frame; and Fig. 11 is a sectional view showing a further modification.

The automobile shown in Fig. 1 comprises a body having side panels 21, roof 22 which may slope in the back to the side panels, transverse cowl section 23, windshield 24 extending from the cowl section to the front of the roof, side doors 25 carrying windows 26, and ventilating windows or wings 27 which are carried on the front side doors and which abut the side edges of the windshield. For the present purposes, the automobile body construction is of a known type, except that the customary A posts have been eliminated. This leads to departures from existing practices at the junction between the cowl and the windshield, and at the region between the windshield and the wings 27. It is with such departures that this invention is particularly concerned.

The windshield 24 is formed of two sheets of glass 28 and a layer of material 29 between the sheets bonding them and making the windshield shatterproof in a well-known manner. The lower end of the windshield 24 rests against a bar 31 and within angle members 32 and 33. Material 30 bonds the edge of the windshield to the bar 31 and the sides of the windshield immediately adjacent the end to the angle members 32 and 33. The bar 31 and the angle members 32 and 33 are of metal, and the material 30 is of a type that bonds metal to glass. The bar 31 has a plurality of threaded openings 34, only one being shown, which receive screws 35. The screws pass through flanges 36 and 37 on the angle members 32 and 33 and through a plate 38 having a flanged edge 39 welded or soldered to the transverse cowl section 23. The screw 35 is tightened so that a head 40 thereon is drawn against a washer 41 between the head 40 and the plate 38 to secure the bar 31, the angle members 36 and 37, and the lower end of the windshield 24 to the plate 38 and the transverse cowl section 23. A pair of interengaging channels 42 and 43 is secured by soldering or welding to the transverse cowl section so as to overly the angle member 32. A plate 44 is secured in spaced relation to the plate 38 by a bolt 45, a nut 46, and a spacing washer 47. A protective strip 48 extends between the plate 44 and a flanged edge 49 on the angle member 33.

Similarly the upper end of the windshield 24 is set in angle members 32 and 33 against a bar 31, and material 30 joins the upper edge of the windshield to the bar and the sides of the windshield immediately adjacent the upper edge to the angle members. Likewise a screw 35 joins the angle members 32 and 33 and the bar 31 to a plate 38 provided with a flange 39. The flange 39 is secured by soldering or welding to the roof 22. By these parts the windshield 24 is joined to the roof 22 in the same manner as to the transverse cowl section. A pair of interengaging channels 42 and 43 is secured by soldering or welding to the roof 22 so as to overly the angle member 32. A plate 50 is spaced from the upper plate 38 by a strip 51. A protective strip 52 extends between the plate 50 and the upper angle 33.

The roof 22 and the transverse cowl section are secured directly to the windshield 24 in the manner described so that the load of the roof is transmitted through the windshield itself to the transverse cowl section. The windshield is placed under compression. There may be conditions under which the windshield is placed under tension, as when a convertible top is used; i. e., the roof may be taken down.

The roof 22 and the transverse cowl section 23 are secured to the windshield by means that are entirely exterior of the windshield, and thus there is no weakening of the windshield due to localized stresses set up by securing means passing through the windshield. The use of a glass-to-metal bond such as the material 33 makes it possible for the means securing the windshield to be kept exterior of the windshield.

The windshield is shown to be of the type comprising two layers of glass with a bonding layer between them preventing shattering, but this is for the purpose of illustration only.

As shown in Figs. 3 and 4, the windshield 24 is formed in two angularly related sections 53 and 54, abutting at edges 55 and 56. The edge 55 on section 53 is at nearly a right angle to the general plane of section 53, and the edge 56 on section 54 is considerably away from a right angle to the general plane of section 54. The edges 55 and 56 are in a plane 57 containing a point 58 at which the eye of the operator will be located. An outer edge 59 on section 53 is considerably away from a right angle to the general plane of section 53 and lies in a plane 60 containing the vantage point 58. An outer edge 61 on section 54 is slightly away from a right angle to the general plane of the section 54 and lies in a plane 62 containing the vantage point 58. Since the edges 55, 56, 59, and 61 lie in planes intersecting at the vantage point 58, they present a minimum of obstruction to the vision of the operator.

Fig. 6 shows a modification in which the portion of the edge 56 projecting beyond the edge 55 is protected by a mass of transparent filler 63.

In Fig. 5 the windshield is formed of angularly related sections 64 and 65 having, respectively, inner edges 66 and 67 and outer edges 68 and 69. The edges 66 and 67 extend at the same angle to directions transverse of their respective sections 64 and 65 so that they lie in a plane extending generally longitudinally of the vehicle. The edges 68 and 69 extend generally transversely of the respective sections 64 and 65.

Fig. 9 shows the side ventilating window or wing 27 to comprise two sheets of glass 70 and a layer 71 of bonding material joining them. Between the window 26 and the wing 27 is a member 72 embracing the window 26. One side of the wing 27 contacts a portion of the member 72 so that the wing 27 may swing outwardly for ventilation.

As seen in Figs. 9 and 10, the upper edge of the wing 27 is mounted in and bonded to a channel 73 by a layer of material 74. A U-shaped member 75 embraces the channel 73 and is joined thereto by rivets 76 passing through a recess 77 cut in the wing 27. A block 78 may fill this recess, and if the block is used, the rivets 76 pass through the block 78. A stem 80 secured to the U-shaped member 75 has a threaded end 81 passing through a depressed portion 82 formed in a top 83 of a hollow top member 84 for the door 25. A shoulder 85 on the stem 80 engages the underside of the depressed portion 82, and a nut 85ª on the threaded end 81 of the stem 80 engages the top of the depressed portion 82. A cotter pin 86 locks the nut to the stem 80. Rubber sealing members 87 and 88 depend from the hollow top member 84. The member 87 extends forwardly from the stem 80 at the outside of the wing 27, and the member 88 extends rearwardly from the stem 80 at the inside of the wing 27, so that the forward portion of the wing 27 may swing inwardly, and the rearward portion, outwardly. The lower edge of the wing 27 is mounted in and bonded to a channel 89 by a layer of material 90. A U-shaped member 91 embraces the channel 89 and is joined thereto by rivets 92 passing through a recess 93 cut in the wing 27. A block 94 may fill this recess, and if the block is used, the rivets 92 will pass through the block 94. A stem 95 is secured to the U-shaped member 91 and extends downwardly through a depressed portion 96 formed in a member 97 forming part of the door 25. The end of the stem 95 is threaded as indicated at 98 and receives a nut 99. A very heavy spring 100 is positioned on the stem 95 between the nut 99 and a washer 101, caused by the spring to engage the under side of the depressed portion 96. A shoulder 102 on the stem 95 engages the top of the depressed portion 96. A hollow box-like structure 103 is secured by screws 104 to the top of the member 97. A rubber sealing member 105 attached to the structure 103 extends forwardly from the stem 95 along the outside of the wing 27, and a rubber sealing member 106, also attached to the structure 103, extends rearwardly from the stem 95 along the inside of the wing 27, so that the forward portion of the wing 27 may swing inwardly, and the rearward portion of the wing 27, outwardly.

Since there is no post at the end of the windshield 24, there is no post at the front end of the door 25. The forward end of the hollow top member 84 is supported through the wing 27 and the stems 80 and 95, the load being transmitted through the wing and stems to the depressed portion 96 in the member 97 of the door 25. Normally the forward end of the hollow top member 84 will load the wing 27 in compression. If on occasion there should be an upward force on the member 84, the wing 27 will be under tension. The stems 80 and 95 are aligned and form a pivot about which the wing 27 swings in opening. The rear end of the top member 84 is secured to and supported by an upright portion 107 at the rear of the door 25.

As shown in Fig. 4, the bonding layer 71 between the glass plates of the side wing 27 extends beyond the forward edge in a curved or bent portion 108, which engages the inside of the edge of the section 54 of the windshield 24 so as to form a seal at this point. During normal operation of the car this seal is sufficient to keep out moisture, since the greater pressure within the car tends to maintain the seal. Fig. 2 shows that the wing 27 adjacent the windshield section 53 has a similar portion 108 engaging the section 53. Fig. 5 shows similar portions 108 engaging the windshield sections 64 and 65.

Fig. 11 shows a modification according to which a small corner post is provided. This post is designated by the reference character 109 and may be formed of sheet metal or may be extruded or forged. It receives a U-shaped sealing member 110, which in turn receives one vertical edge of the windshield 24. A portion 111 of the post carries a seal 112, against which a side window 113 rests. In spite of the side post 109 the windshield 24 carries the load in the same way that the windshield 24 of the other figures carries the load. The side post 109 may be provided for appearance only or may be employed to modify the sealing of the side window.

It will be apparent from the foregoing description that new and novel constructions for windshields and side windows have been provided that make possible the elimination of vision-obstructing parts.

The intention is to limit the invention only within the scope of the appended claims.

I claim:

1. In combination, a vehicle body, a roof, a transparent windshield extending between the vehicle body and the roof, means acting externally of the windshield and bonding the lower edge of the windshield to the vehicle body for transmitting tension and compression loads between the windshield and the vehicle body, means acting entirely externally of the windshield and bonding the upper edge of the windshield to the roof for transmitting tension and compression loads between the windshield and the roof.

2. In combination, a vehicle body, a roof, a transparent windshield extending between the vehicle body and the roof, means acting entirely externally of the windshield and bonding the lower very edge of the windshield and the portions of the sides thereof immediately adjacent the lower very edge to the vehicle body for transmitting tension and compression loads between the windshield and the vehicle body, and means acting entirely externally of the windshield and bonding the upper very edge of the windshield and the portions of the sides thereof immediately adjacent the upper very edge to the roof for transmitting tension and compression loads between the windshield and the roof.

3. In combination, a vehicle body, a roof, a transparent windshield extending between the vehicle body and the roof, means acting entirely externally of the windshield to connect the lower edge of the windshield to the vehicle body for transmitting tension and compression loads between the windshield and the vehicle body, and means acting entirely externally of the windshield to connect the upper edge of the windshield to the roof for transmitting tension and compression loads between the roof and the windshield.

4. In combination, a vehicle body, a roof, a transparent windshield extending between the vehicle body and the roof, a first bar bonded to the upper edge of the windshield and having a threaded opening, a first pair of angle members having first legs bonded to both sides of the windshield immediately adjacent the upper edge and second legs overlapping one another across the first bar, a first screw extending through the overlapping legs of the first pair of angle members and engaging the roof and the threaded hole in the first bar for connecting the roof and the upper edge of the windshield, a second bar bonded to the lower edge of the windshield and having a threaded opening, a second pair of angle members having first legs bonded to both sides of the windshield immediately adjacent the lower edge and second legs overlapping one another across the second bar, a second screw extending through the overlapping legs of the second pair of angle members and engaging the vehicle body and the threaded hole in the second bar for connecting the vehicle body and the lower edge of the windshield.

5. In combination, a vehicle body, a roof, a transparent windshield extending between the vehicle body and the roof, means acting externally of the windshield and bonding the lower edge of the windshield to the vehicle body for transmitting tension and compression loads between the windshield and the vehicle body, and means acting externally of the windshield and bonding the upper edge of the windshield to the roof for transmitting tension and compression loads between the windshield and the roof, the windshield being formed of two angularly related sections, the edges of the sections lying generally in planes intersecting at a region of the vantage point of the operator of the vehicle for providing a minimum of obstruction to the operator's vision.

6. In combination, a vehicle body, a roof, a transparent windshield extending between the vehicle body and the roof, means acting entirely externally of the windshield to connect the upper edge of the windshield to the roof for transmitting tension and compression loads between the roof and the windshield, said means comprising a first strip bonded to the upper edge of the windshield and having a threaded opening and a first screw engaging the roof and the threaded opening of the first strip, and means acting entirely externally of the windshield to connect the lower edge of the windshield to the vehicle body for transmitting tension and compression loads between the windshield and the vehicle body, said means comprising a second strip bonded to the lower edge of the windshield and having a threaded opening and a second screw engaging the vehicle body and the threaded opening of the second strip for connecting the lower edge of the windshield to the vehicle body.

HAROLD A. HICKS.

REFERENCES CITED

The following references are of record in the file of this patent:

UNITED STATES PATENTS

| Number | Name | Date |
| --- | --- | --- |
| 1,728,240 | Hasselkus | Sept. 17, 1929 |
| 2,043,756 | Lalancette | June 9, 1936 |
| 2,061,760 | Fisher | Nov. 24, 1936 |
| 2,087,821 | Simpson | July 20, 1937 |
| 2,171,191 | Potter | Aug. 29, 1939 |
| 2,260,133 | Ball | Oct. 21, 1941 |
| 2,274,824 | Clark et al. | Mar. 3, 1942 |
| 2,290,873 | Graf | July 28, 1942 |
| 2,350,430 | Ulrich | June 6, 1944 |

FOREIGN PATENTS

| Number | Country | Date |
| --- | --- | --- |
| 476,239 | Great Britain | Dec. 6, 1937 |